United States Patent
Dutta (10) Patent No.: US 9,369,379 B2
(45) Date of Patent: Jun. 14, 2016

(54) SYSTEM AND METHOD PROVIDING SECURED CONTEXTS IN MPLS LFIB

(71) Applicant: Pranjal K Dutta, Sunnyvale, CA (US)

(72) Inventor: Pranjal K Dutta, Sunnyvale, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/502,628

(22) Filed: Sep. 30, 2014

(65) Prior Publication Data

US 2016/0094438 A1    Mar. 31, 2016

(51) Int. Cl.
*H04L 12/723*  (2013.01)

(52) U.S. Cl.
CPC ...................... *H04L 45/50* (2013.01)

(58) Field of Classification Search
CPC ........................................ H04L 45/50
USPC ........................................ 370/389
See application file for complete search history.

(56) References Cited

U.S. PATENT DOCUMENTS

2013/0266013 A1* 10/2013 Dutta ............... H04L 45/28
                                                         370/392

OTHER PUBLICATIONS

E. Rosen, et al. "Multiprotocol Label Switching Architecture", RFC 3031, *Network Working Group Request for Comments: 3031 Category: Standards Track*, Jan. 2001.

L. Andersson, Ed. et al. "LDP Specification", RFC 5036, *Network Working Group Request for Comments: 5036 Obsoletes: 3036 Category: Standards Track*, Oct. 2007.

* cited by examiner

*Primary Examiner* — Ronald B Abelson (74) *Attorney, Agent, or Firm* — Tong, Rea, Bentley & Kim, LLC (57) ABSTRACT

A system, method and apparatus for enabling validation of packets received from a label switched router (LSR) via a label switched path (LSP) wherein an LSR assigning LSP label/FEC bindings further associates a respective epoch label with each binding, the advertised bindings and associated epoch labels being included within transmitted packets to enable verification of received packets by matching included Epoch label to the Epoch label originally associated with the packet LSP label.

20 Claims, 7 Drawing Sheets

SYSTEM AND METHOD PROVIDING SECURED CONTEXTS IN MPLS LFIB

FIELD OF THE INVENTION

The invention relates to the field of communication networks such as multi-protocol label switching (MPLS) networks and, more particularly but not exclusively, to traffic forwarding capability (TFC) in a network.

BACKGROUND

Multiprotocol Label Switching (MPLS) enables efficient delivery of a wide variety of differentiated, end-to-end services. The Internet Engineering Task Force (IETF) describes architecture for Multiprotocol Label Switching (MPLS) in its Request for Comment (RFC) document denoted as RFC 3031, and entitled "Multiprotocol Label Switching Architecture." A number of related IETF documents define additional functionality/requirements associated with MPLS networks and network elements.

A Label Switched Path (LSP) is a sequence of LSRs that participates in Label Switching for a Forwarding Equivalence Class (FEC). All packets belonging to the FEC flow across the LSP from a head- and/or ingress Label Edge Router (LER) to an egress LER, being forwarded at each intermediate LSR in accordance with a local Label Forwarding Information Base (LFIB).

A fundamental concept in MPLS is that two Label Switching Routers (LSRs) must agree on the meaning of the labels used to forward traffic between and through them. This common understanding is achieved via a set of procedures for signaling between LSRs, called a label distribution protocol, by which one LSR informs another of label bindings it has made; that is, the label it has assigned to packets associated with a particular FEC. Signaling mechanisms may comprise Label Distribution Protocol (LDP) which is described in more detail in IETF RFC 5036, Resource Reservation Protocol-Traffic Engineering (RSVP-TE), which is described in more detail in IETF RFC 3209, and Multiprotocol Extensions for Border Gateway Protocol (MP-BGP) which is described in more detail in IETF RFC 2858. The label distribution protocols reside in the MPLS control plane and create an LIB (Label Information Base) at each participating LSR.

In Downstream Label Assignment, the decision to bind a particular label L to a particular FEC is made by an LSR (Rd) which is downstream (i.e., a potential next-hop) with respect to that binding. The downstream LSR (Rd) informs the upstream LSR (Ru) of the binding by distributing or advertising label bindings in the "downstream to upstream" (Rd→Ru) direction. The upstream LSR (Ru) forwards packets of a particular FEC to downstream LSR (Rd) in accordance with the label assigned to that FEC by the downstream LSR (Rd).

In Upstream Label Assignment, the decision to bind a particular label L to a particular FEC F is made by the LSR Ru which is upstream with respect to that binding.

It is important to keep the control plane LIB synchronized with the data plane LFIB between peering LSRs to avoid a label over-lapping occurrence in the LFIB of a downstream LSR. For example, a Label Mapping Message is used to advertise a binding to a peering LSR (e.g., downstream assigned label L1 distributed by Rd to Ru for FEC F1). Similarly, a Label Withdraw Message is used to withdraw a binding by Rd previously advertised to Ru. In response to a Label Withdraw message from Rd for L1→F1 binding, Ru sends a back Label Release message as an acknowledgement that Ru has deprogrammed the Label L1 from its data plane, such as from a Next Hop Label Forwarding Entry (NHLFE) within the Ru Label Forwarding Information Base (LFIB).

However, if Rd redistributes the same label L1 for another FEC F2 without Ru confirming release of the label L1 then Rd may be still receiving packets from Ru with label L1 for FEC F1 but instead would switch/interpret as packet for F2. This is termed as "label over-lapping" or "ILM over-lapping" in LFIB which is a severe security violation issue in an MPLS encapsulated payload. MPLS is a fundamental technology used to enable VPN (Virtual Private Network) and other technologies. Due to label over-lapping between two VPNs, the traffic belonging to one VPN gets forwarded to another VPN.

Unfortunately, acknowledgment based methods such as Label Release are either unreliable or simply do not exist in some label distribution protocols (e.g., RSVP-TE, MP-BGP). As a result, these label distribution protocols are especially susceptible to improper synchronization between control plane LIB and data plane LFIB at one or more LSRs.

SUMMARY

Various deficiencies in the prior art are addressed by systems, methods and apparatus for enabling validation of packets received from a label switched router (LSR) via a label switched path (LSP) wherein an LSR assigning LSP label/FEC bindings further associates a respective Epoch Label with each binding, the advertised bindings and associated Epoch Labels being included within transmitted packets to enable verification of received packets by matching included Epoch Label to the Epoch Label originally associated with the packet LSP label. In this manner, the various embodiments avoid or reduce "label over-lapping" problems due to, illustratively, improper synchronization between forwarding information base data used by Label Switched Routers (LSRs) within an MPLS network.

In one embodiment, a method enabling validation of packets received from a label switched router (LSR) via a label switched path (LSP) invoked at a LSP label/FEC assigning LSR comprises associating each of at least one LSP label to forwarding equivalency class (FEC) bindings with a respective Epoch Label; storing each label/FEC binding and respective Epoch Label in a Label Forwarding Information Base (LFIB); and including, within each Label Mapping Message (LMM) advertising a label/FEC binding via a label distribution protocol (LDP), the respective Epoch Label; wherein an LSP labeled packet including an Epoch Label not associated with the LSP label is deemed invalid.

In one embodiment, an apparatus including a processor and a memory communicatively connected to the processor for enabling validation of packets received from a label switched router (LSR) via a label switched path (LSP) by associating each of a plurality of LSP label to FEC bindings with a respective Epoch Label; storing each LSP label and respective Epoch Label in a Label Forwarding Information Base (LFIB); and including, within each Label Mapping Message (LMM) advertising a binding, the respective Epoch Label; wherein an LSP labeled packet including an Epoch Label not associated with the LSP label is deemed invalid.

In another embodiment, an apparatus including a processor and a memory communicatively connected to the processor for processing packets prior to transmission toward a next label switched router (LSR) via a label switched path (LSP) by configuring a transmission packet to include an LSP label bound to the forward equivalency class (FEC) including the transmission packet; and configuring the transmission packet to include an Epoch Label associated with the LSP label.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Various embodiments will be described within the context of a network supporting Multi-Protocol Label switching, such as defined in IETF RFC3031 and RFC5036, each of which is herein incorporated by reference in its respective entirety. In particular, various embodiments are well adapted to avoiding or reducing "label over-lapping" problems due to improper synchronization between forwarding information base data used by Label Switched Routers (LSRs) within an MPLS network.

Various embodiments provide a mechanism whereby each instance of an LSP Label to Forward Equivalency Class (FEC) binding is associated with a respective Epoch Label. Packets transmitted in accordance with the LSP label are adapted to further include the associated Epoch Label. Received packets are examined to determine whether the received packet Epoch Label is expected to be associated with the received packet LSP label. If the Epoch Label is not the same as the expected Epoch Label, then the received packet is likely invalid and should be discarded.

Various embodiments contemplate mechanisms for generating Epoch Labels, mechanisms for determining whether or not a particular Label Switched Router (LSR) is capable of using Epoch Labels in the manner described herein, mechanisms for negotiating the use of Epoch Labels between LSRs, mechanisms for using Epoch Labels within the context of a subset of transmitted packets and so on.

Figure 1:
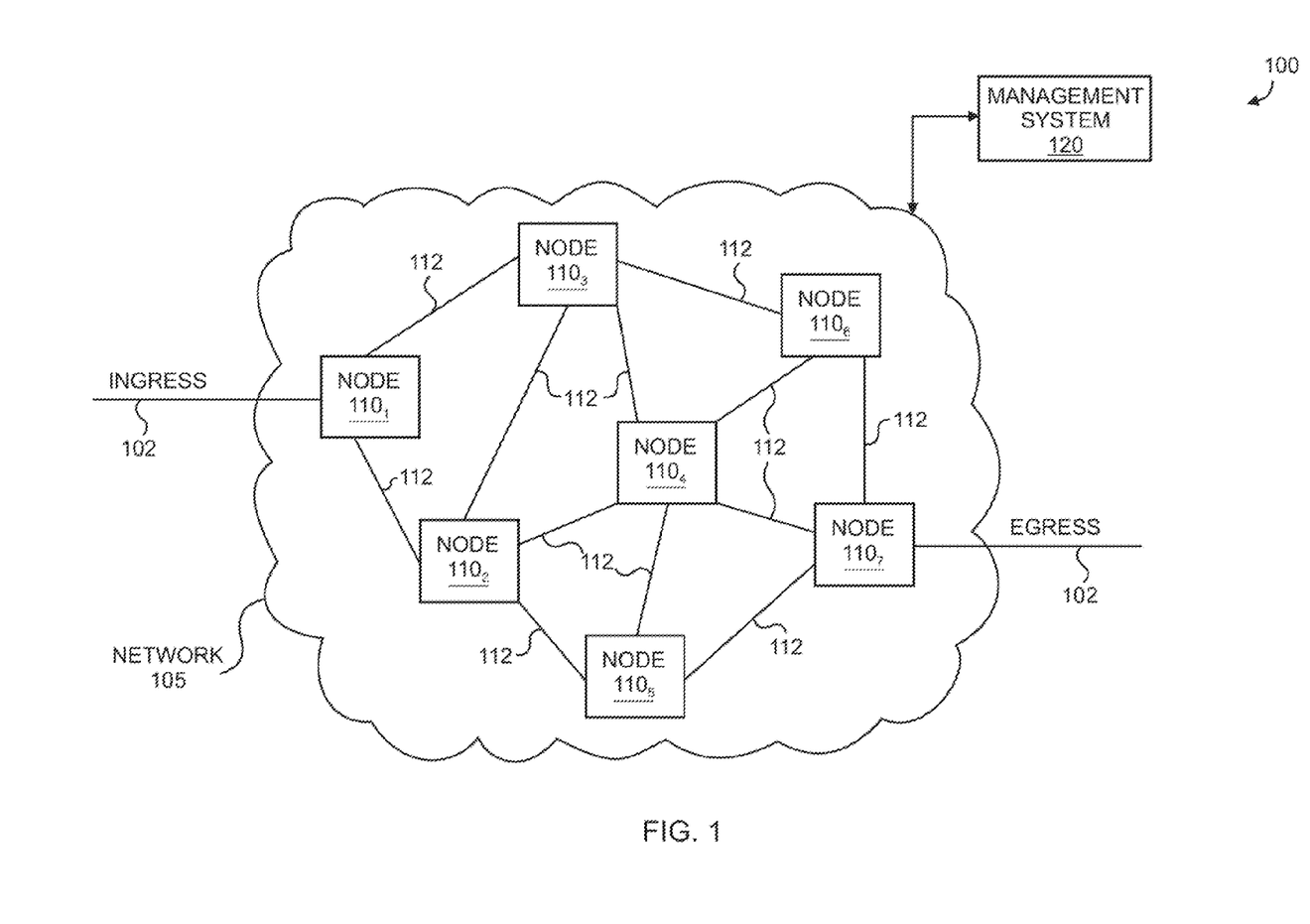
FIG. 1 depicts an exemplary network benefiting from the various embodiments.

FIG. 1 depicts a high-level block diagram of a communication network benefiting from various embodiments. Specifically, the communication network 100 of FIG. 1 includes a plurality of nodes 110$_1$-110$_7$ (collectively, nodes 110). The nodes 110 support various combinations of network interfaces NIs 112 and/or external interfaces (EIs) 102. Nodes 110 communicate with external devices (e.g., nodes of other network domains, user devices, and the like) using EIs 102. NIs 112 may include network links. EIs 102 may include external links.

The nodes 110 include communication nodes supporting packet-based communications. In one embodiment, nodes 110 include communication nodes supporting various communication technologies for routing packets there between in accordance with Multiprotocol Label Switching (MPLS). The NIs 112 and EIs 102 include interfaces supporting any communication technologies supported by associated nodes 110.

Although primarily depicted and described herein with respect to a communication network having specific types, numbers, and configurations of nodes 110, NIs 112, and EIs 102, the present embodiments may be implemented in communication networks having various other types, numbers, and configurations of nodes 110, NIs 112, and EIs 102. Similarly, although primarily depicted and described herein with respect to specific multicast communication technologies, the present embodiments may be implemented using various other unicast communication technologies, multicast communication technologies, and the like, as well as various combinations thereof.

The network may be modified by those skilled in the art to use other MPLS related protocols rather than the exemplary protocol discussed herein.

Network 100 includes an IP/MPLS communication network (CN) 105 and at least one network management system (NMS) 120 operative to, illustratively, route traffic between an originating LSR 110-1 and a destination LSR 110-7 via one or more label switched paths (LSPs) 112.

As depicted, NMS 120 is operative to control a plurality of routers 110 forming the CN 105; namely, a plurality of Label Switched Routers (LSRs) 110-1 through 110-7. It will be noted that while only seven LSRs are depicted, CN 105 may include many more LSRs. The representation of CN 105 is simplified for purposes of this discussion.

The NMS 120 is a network management system adapted for performing the various management functions described herein. The NMS 120 is adapted to communicate with nodes of CN 105. The NMS 120 may also be adapted to communicate with other operations support systems (e.g., Element Management Systems (EMSs), Topology Management Systems (TMSs), and the like, as well as various combinations thereof).

The NMS 120 may be implemented at a network node, network operations center (NOC) or any other location capable of communication with CN 105 and various elements related thereto. NMS 120 may support user interface capabilities to enable one or more users to perform various network management, configuration, provisioning or control related functions (e.g., enter information, review information, initiate execution of various methods as described herein and the like). Various embodiments of the NMS 120 are adapted to perform functions as discussed herein with respect to the various embodiments. The NMS 120 may be implemented as a general purpose computing device or specific purpose computing device, such as described below with respect to FIG. 6.

NMS 120 and the various routers 110 operate to support data plane fate separation of LDP LSPs. The Multi-Protocol Label Switching (MPLS) architecture is described in RFC3031 in IETF.

As depicted in FIG. 1, a traffic stream (e.g., a video or other data stream) is communicated from a source node, illustratively, LSR 110-1 to a destination node, illustratively, LSR 110-7 via one or more label switched paths (LSPs) 112. For example, assume that a primary path originates at source node (LSR 110-1), traverses the core of CN 105 via two or more intermediate/transit LSRs, and terminates at node 110-6 (LSR 110-6) with LSR 110-7 being the destination node. A secondary path originates at source node (LSR 110-1), traverses the core of CN 105 via two or more intermediate/transit LSRs, and terminates at node 110-5 (LSR 110-5) with Edge LSR 110-7 being the destination node. It will be appreciated that the various embodiments operate within the context of a single LSP, or each of a plurality of LSPs such as primary/backup LSPs and the like.

Each of the primary LSP and secondary LSP includes a respective sequence of LSRs which communicate with each other via Label Distribution Protocol (LDP), Resource Reservation Protocol-Traffic Engineering (RSVP-TE), Multiprotocol Extensions for Border Gateway Protocol (MP-BGP) and/or some other protocol.

For purposes of discussion it will be assumed that an LSP (e.g., primary path) is formed as follows: ingress LSR 110-1 to transit LSR 110-2, to transit LSR 110-5, to egress LSR 110-7. All packets belonging to a particular FEC flow across the LSP from a head and/or ingress Label Edge Router (LER) to the egress LER, being forwarded at each intermediate/transit LSR in accordance with a local Label Forwarding Information Base (LFIB).

Various embodiments use Downstream Label Assignment, in which the decision to bind a particular label L to a particular FEC F is made by an LSR (Rd) which is downstream (i.e., a potential next-hop) with respect to that binding. For example, transit LSR 110-5 may determine label/FEC bindings and communicate the label/FEC bindings (along respect of Epoch Labels) toward transit node 110-2.

Various embodiments use Upstream Label Assignment, in which the decision to bind a particular label L to a particular FEC F is made by the LSR Ru which is upstream with respect to that binding. For example, transit LSR 110-2 may determine label/FEC bindings and communicate the label/FEC bindings (along respect of Epoch Labels) toward transit node 110-5.

The forwarding table in an LSR is termed a Label Forwarding Information Base (LFIB) and includes various information used to process packets, such as a Next Hop Label Forwarding Entry (NHLFE), Incoming Label Map (ILM) and FEC-to-NHLFE Map (FTM).

The NHLFE is used when forwarding a labeled packet to a next hop. The NHLFE contains information pertaining to the next hop for the packet, the operation to perform on the label stack of the packet such as swap/push/pop of labels, the data link encapsulation to use when transmitting the packet, and any other information needed to properly dispose of the packet. The ILM maps each FEC incoming label to a set of NHLFEs. It is used when forwarding packets that arrive as labeled packets in transit LSR or egress LER. The FTN maps each FEC to a set of NHLFEs. It is used when forwarding packets at ingress LSR that arrive unlabeled, but which are to be labeled before being forwarded.

Figure 2:
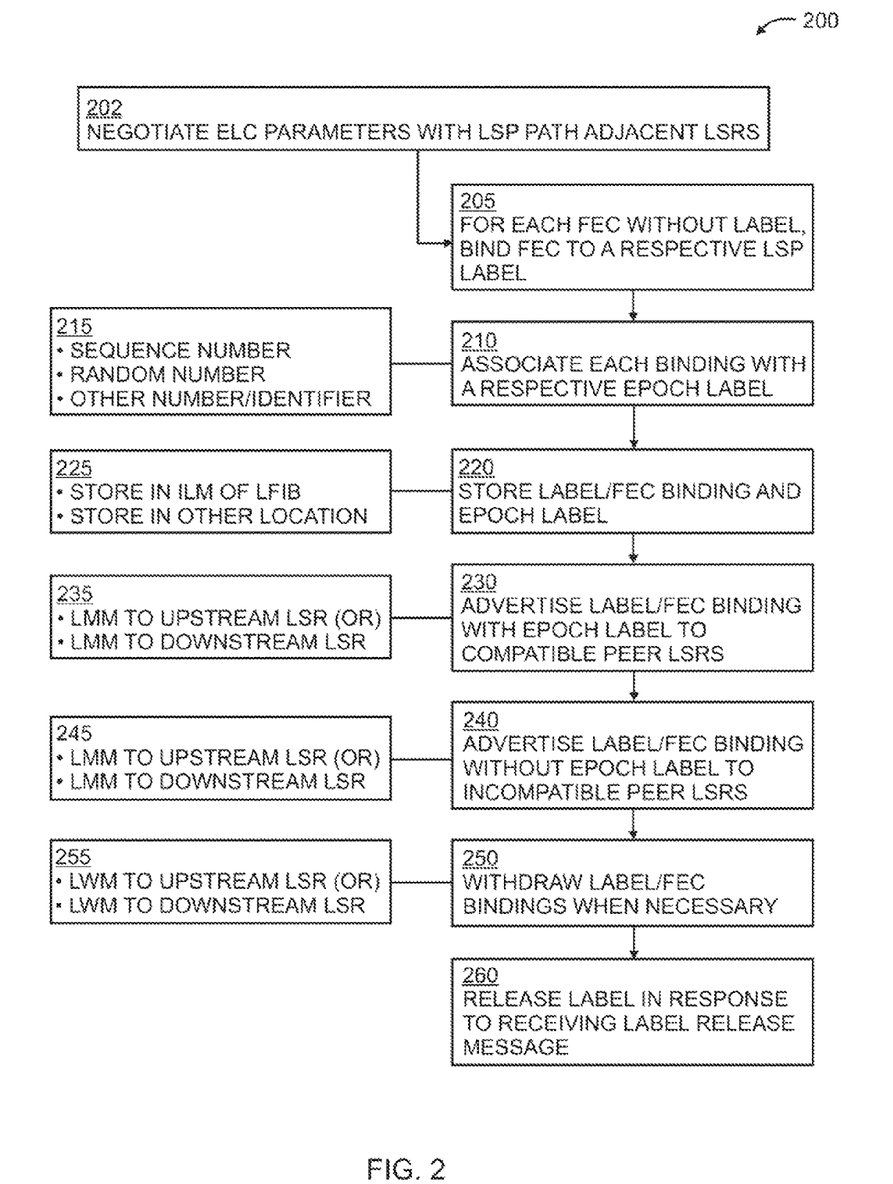
FIG. 2 depicts a flow diagram of a method of generating label assignments according to one embodiment.

FIG. 2 depicts a flow diagram of a method of generating label assignments according to one embodiment. In various embodiments an LSR is configured to assign and manage LSP label/FEC bindings in accordance with the method 200 of FIG. 2.

At step 202, Epoch Label Capability (ELC) parameters/criteria are negotiated by the LSR with the LSP path adjacent LSRs if needed. That is, whether or not to use Epoch Labels, how to use Epoch Labels and so on is negotiated by one or more LSRs along the LSP. In various embodiments, such negotiation is unnecessary since all LSR is of a particular LSP are selected as having ELC. In various embodiments, partial use of ELC is provided depending on, for example, traffic security/priority criteria, user criteria, service provider criteria, service level agreement (SLA) and/or other criteria, such as discussed in more detail below with respect to FIG. 6.

At step 205, at an LSR generating LSP label to FEC bindings within the LSP, each FEC without a label for use within the LSP is bound to a respective LSP label.

At step 210, each LSP label/FEC binding is associated with a respective Epoch Label. Referring to box 215, the Epoch Label may comprise a next number in a sequence of numbers used to generate Epoch Labels, a random number or some other relatively unique number or identifier. Generally speaking, the purpose of the Epoch Label is to identify the specific label/FEC binding instance in a relatively unique manner.

At step 220, the label/FEC binding information as well as the associated Epoch Label are stored at the LSP. Referring to box 225, this information may be stored in a database at the LSR, such as within an Incoming Label Map (ILM) field within a Label Forwarding Information Base (LFIB). Other databases and/or other locations within the LFIB may also be used for this purpose.

At step 230, the label/FEC binding along with the associated Epoch Label is advertised to compatible peer LSRs. A compatible LSR comprises an LSR that will include Epoch Labels along with LSP labels in transmitted packets, process received packets to identify Epoch Labels and so on as described herein. Referring to box 235, this advertising may be performed by formatting and transmitting a Label Mapping Message (LMM) to an upstream LSR (in the case of Downstream Label Assignment) or to a downstream LSR (in the case of Upstream Label Assignment).

At step 240, the label/FEC binding without the associated Epoch Label is advertised to incompatible peer LSRs. An incompatible LSR comprises an LSR that, for whatever reason, will not include Epoch Labels along with LSP labels in transmitted packets, will not process received packets to identify Epoch Labels and so on as described herein. Referring to box 245, this advertising may be performed by formatting and transmitting a Label Mapping Message (LMM) to an upstream LSR (in the case of Downstream Label Assignment) or to a downstream LSR (in the case of Upstream Label Assignment).

At step 250, one or more label/FEC bindings are withdrawn as necessary, such as in response to a determination of a traffic flow, expiration of an authorization window or some other event/instruction. Referring to box 255, this withdrawal may be performed by formatting and transmitting a Label Withdraw Message (LWM) to an upstream LSR (in the case of Downstream Label Assignment) or to a downstream LSR (in the case of Upstream Label Assignment). Thus, in response to a determination that a label/FEC binding should be terminated for some reason, a corresponding LWM identifying at least the label/FEC binding is transmitted to one or more peer LSRs.

At step 260, a label is released for subsequent reuse if desired in response to receiving a Label Release Message (LRM) from an upstream LSR (in the case of Downstream Label Assignment) or from a downstream LSR (in the case of Upstream Label Assignment).

Figure 3:
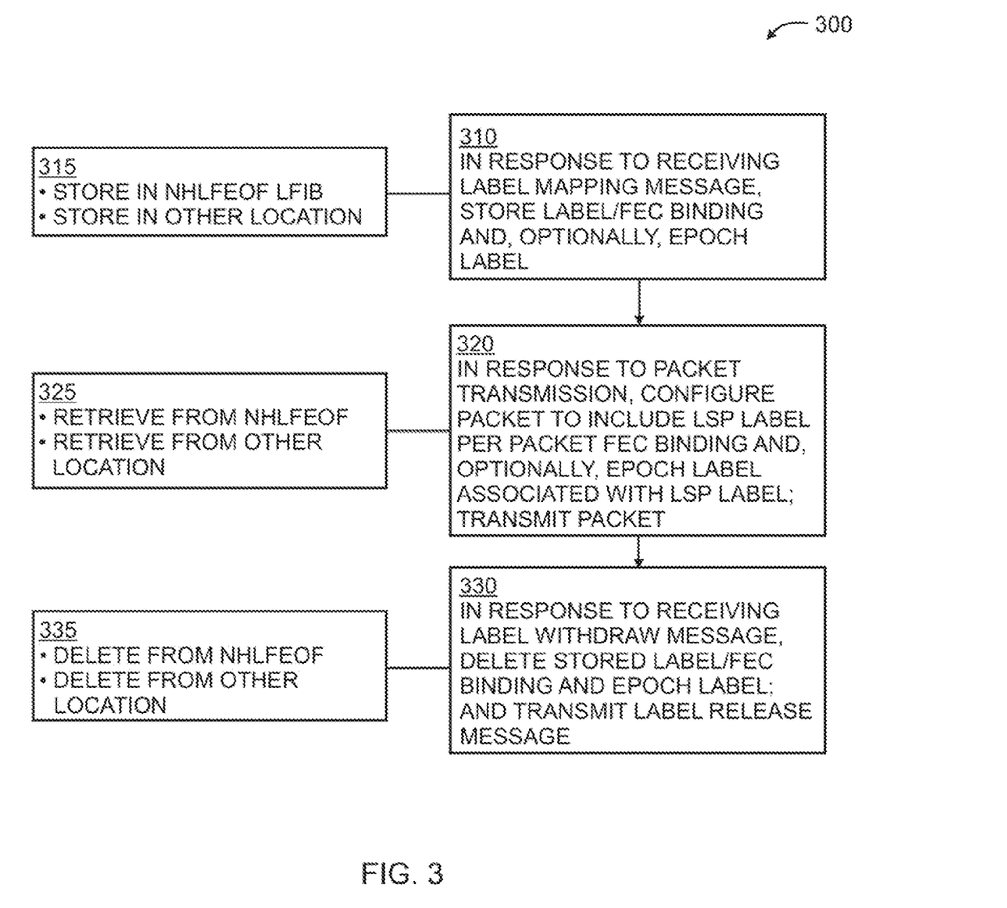
FIG. 3 depicts a flow diagram of a method of processing received label assignments according to one embodiment.

FIG. 3 depicts a flow diagram of a method of processing label assignments according to one embodiment. In various embodiments an LSR is configured to transmit packets in accordance with the LSP label/FEC bindings received from and assigning LSP, such as an LSP configured in accordance with the method 200 of FIG. 2.

At step 310, at an LSR receiving a Label Mapping Message (LMM) including label binding advertising from an assigning LSR, the label/FEC binding information as well as any associated Epoch Label is stored. Referring to box 315, this information may be stored in a database at the LSR, such as within a Next Hop Label Forwarding Entry (NHLFE) field within a Label Forwarding Information Base (LFIB). Other databases and/or other locations within the LFIB may also be used for this purpose.

At step 320, in response to a need to transmit a packet, the packet is configured to include the LSP label appropriate to the packet FEC and, optionally, the Epoch Label associated with the LSP label. The packet is then transmitted. Referring to box 325, this information may be retrieved from the Next Hop Label Forwarding Entry (NHLFE) field within the Label Forwarding Information Base (LFIB), or other database/location holding the information.

Generally speaking, labeled packets transmitted by a transmitting LSR include both of the LSP label and Epoch Label in the label stack. Upon receiving these packets, the receiving LSR checks to see if the received Epoch Label matches an expected Epoch Label. If no match exists, then the packet receiving LSR drops the packet as invalid.

At step 330, in response to receiving a Label Withdraw Message (LWM) associated with a particular LSP label, the stored label/FEC binding information and associated Epoch Label are deleted and a Label Release Message (LRM) is transmitted to the assigning LSR. Referring to box 335, the stored label/FEC binding information and associated Epoch Label if any are deleted from, illustratively, the NHLFE field within the Label Forwarding Information Base (LFIB) or other database/location holding the information.

Figure 4:
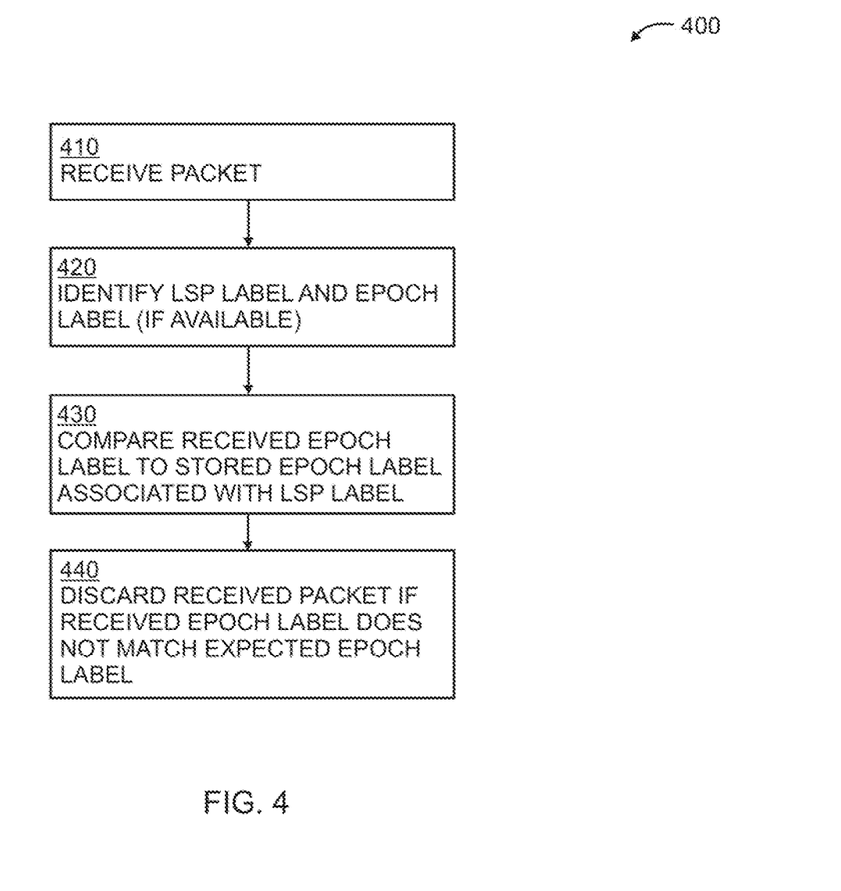
FIG. 4 depicts a flow diagram of a method of validating received packets according to one embodiment.

FIG. 4 depicts a flow diagram of a method of validating received packets according to one embodiment. In various embodiments an assigning LSR is configured to process received packets in accordance with the previously assigned LSP label/FEC bindings and Epoch Labels to determine whether or not a received packet is valid.

At step 410, a packet is received.

At step 420, the received packet is examined to identify the LSP label along with the Epoch Label (if available).

At step 430, the Epoch Label in the received packet is compared to an expected Epoch Label, such as the Epoch Label previously associated with the LSP label of the received packet. Specifically, previously assigned label/FEC bindings and associated Epoch Labels are retrieved from a storage location or database at the LSR, such as within an Incoming Label Map (ILM) field within a Label Forwarding Information Base (LFIB). Other databases and/or other locations within the LFIB may also be used for this purpose.

At step 440, if the Epoch Label within the received packet does not match the expected Epoch Label (such as retrieved from the ILM of the LFIB), then the packet is deemed to be invalid. Invalid packets are normally discarded.

The methods 200-400 described above with respect to FIGS. 2-4 contemplate the use of an Epoch Label to uniquely identify each instance of an assigned LSP label/FEC binding. A received packet including an LSP label as well as an unexpected Epoch Label is likely caused by an expired or previously withdrawn label which should not be in use. In any event, the particular LSP label/FEC binding instance of the received packet is not correctly identified by the Epoch Label included within the received packet, therefore the received packet is invalid and should be discarded.

Generally speaking, various embodiments operate to keep the control plane LIB synchronized with the data plane LFIB between peering LSRs to avoid a label over-lapping occurrence in the LFIB of a downstream LSR.

In various embodiments, the Epoch Label represents a "sequence number" or "instance" associated with Label used for binding to a FEC. In this manner, implementing a sequence number as another Label allows implementation within the context of MPLS LFIB without any modifications of existing procedures, except those modifications used to interpret an Epoch Label at a receiving LSR.

Assuming that an upstream LSR Ru forwards to downstream LSR Rd a packet belonging to FEC class F1, the packet may be configured according to the following format (e.g., such as at step 320):

On receipt of the packet, the receiving LSR Rd may look up the first label L1 in its ILM (LFIB). From lookup of L1, receiving LSR Rd knows that it is expecting an Epoch Label as next entry in stack. Rd may then match the Epoch Label against what is expected. If Epoch Label does not match what is programmed in ILM for L1, then receiving LSR Rd may drop the packet as being an invalid packet. If the Epoch Label matches, then the receiving LSR Rd may forward the packet further as per NHLFE associated with the ILM for L1.

Figure 5:
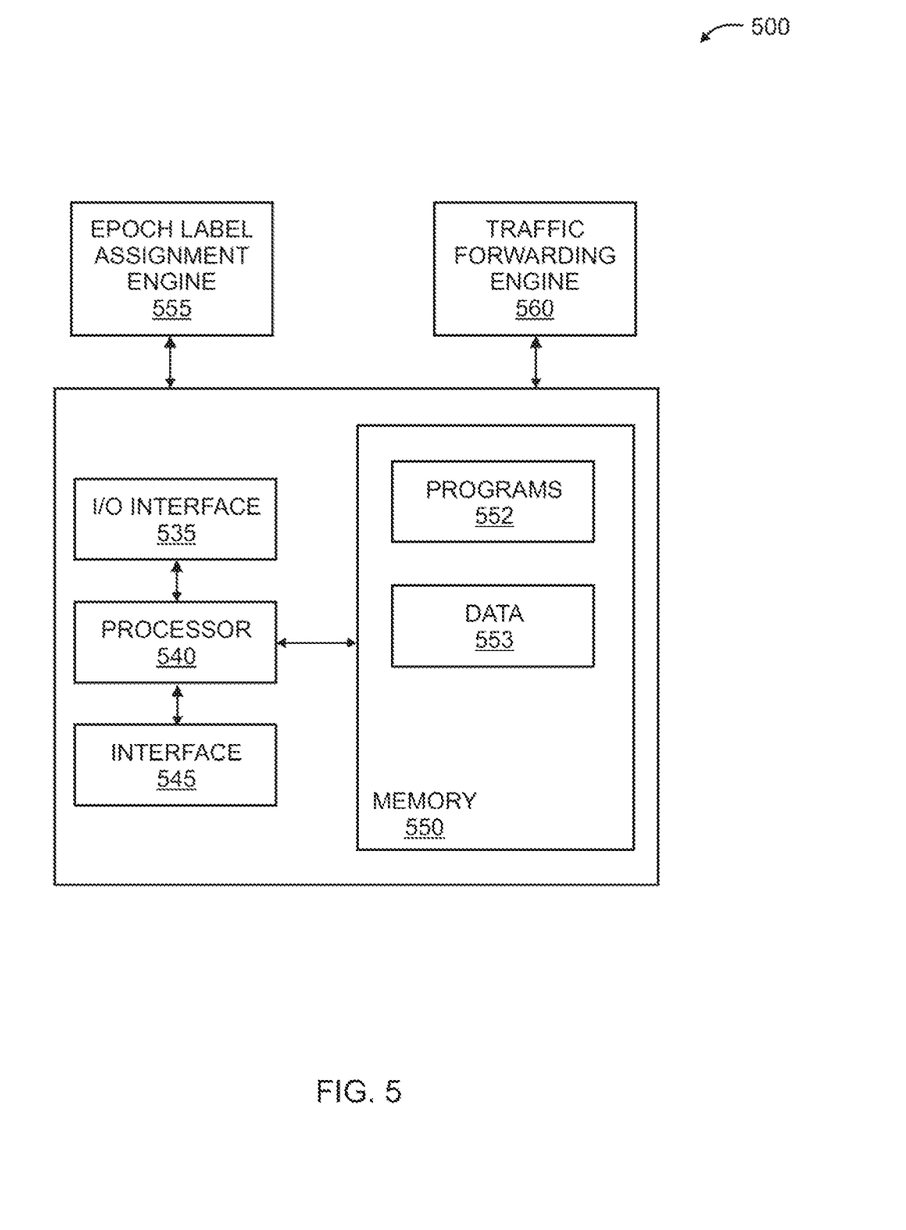
FIG. 5 depicts a high level block diagram of a control portion of an exemplary node suitable for implementing various embodiments.

It is noted that the use of Epoch Labels as described herein does increase the size of overall label stack of MPLS labeled packets. If an MPLS packet carries multiple stacked labels then an Epoch Label can be included for each of them or can be used selectively depending on needs for security at selected hierarchy. The positioning of Epoch Labels in an N label stack may be configured according to the following format:

FIG. 5 depicts a high level block diagram of a control portion 500 of an exemplary node suitable for implementing various embodiments, such as a control portion of LDP nodes 110. As depicted in FIG. 5, a node control portion 500 includes one or more processor(s) 540, a memory 550, an input/output (I/O) interface 535 and a network interface 545.

The processor(s) 540 are adapted to cooperate with the memory 550, the network interface 545, the I/O interface 535 and the like to provide the various functions described herein with respect to the nodes 110. In various embodiments, the control portion 500 of an exemplary node may be implemented as described below with respect to the computing device of FIG. 6.

The memory 550, generally speaking, stores programs, data, tools and the like that are adapted for use in providing various control plane and data plane functions associated with the nodes 110. The memory 550 is depicted as storing programs 552 and data 553 useful in supporting the various control plane and data plane functions depicted and described herein. For example, memory 550 is depicted as storing programs 522 and data 523 adapted for use in providing various data plane and control plane functions within the MPLS communication system described herein with respect to the figures.

Also depicted in FIG. 5 is an Epoch Label Assignment Engine 555 and a traffic forwarding engine 560. These engines may be implemented as hardware or firmware modules external to the node control portion 500 described herein. In various embodiments, these engines may be included within or implemented by the node control portion 500 or nodes 110 described herein.

In various embodiments, this memory 550 includes programs and data associated with Epoch Label Assignment Engine 555 and Traffic Forwarding Engine 560. In various embodiments, Epoch Label Assignment Engine 555 and Traffic Forwarding Engine 560 are implemented using software instructions which may be executed by processor (e.g., processor 503) for performing the various functionalities depicted and described herein.

I/O interface 535 and network interface 545 are adapted to facilitate communications with peripheral devices both internal and external to processor 540. For example, I/O interface 535 is adapted to interface with memory 550. Similarly, I/O interface 535 is adapted to facilitate communications with LDP node 110$_N$, Epoch Label Assignment Engine 555, Traffic Forwarding Engine 560 and the like. In various embodiments, a connection is provided between processor ports and any peripheral devices used to communicate with the MPLS network (not shown).

Although primarily depicted and described with respect to LDP node 110 control portion communication with Epoch Label Assignment Engine 555 and Traffic Forwarding Engine 560, it will be appreciated that I/O interface 535 may be adapted to support communications with any other devices suitable for providing the Traffic Forwarding Capability (TFC) to be associated with the Epoch Label and LDP label/FEC binding functions described herein.

Epoch Label Assignment Engine 555 and Traffic Forwarding Engine 560 cooperate to provide the various functions depicted and described herein. Although depicted and described with respect to embodiments in which the engines are external and/or internal to the depicted control portion 500 of an exemplary node, it will be appreciated by those skilled in the art that the engines may be stored in one or more other storage devices internal and/or external to LDP node 110 and/or node control portion 500 thereof. The engines may be distributed across any suitable numbers and/or types of storage devices internal and/or external to LDP node 110 and/or node control portion 500 thereof. Memory 550, including the engines of memory 550, is described in additional detail herein below. Further, it will be appreciated that any of the functions depicted and described herein may be performed by and/or using the engines may be performed by other elements implementing similar functions.

Epoch Label Capability (ELC) TLV

Various embodiments use a new type-length-value (TLV) element denoted herein as a "ELC" TLV suitable for use by an LSR to indicate to a corresponding LSR peer (e.g., an LSR upstream or downstream the LSP) that the use of an Epoch Label capability is desired for LSP label/FEC bindings associated with packets transmitted between the LSRs. The ELC TLV may be communicated via an LDP session established with a peer LSR, such as within an Optional Parameter portion of a Hello Message or some other mechanism.

Figure 6:
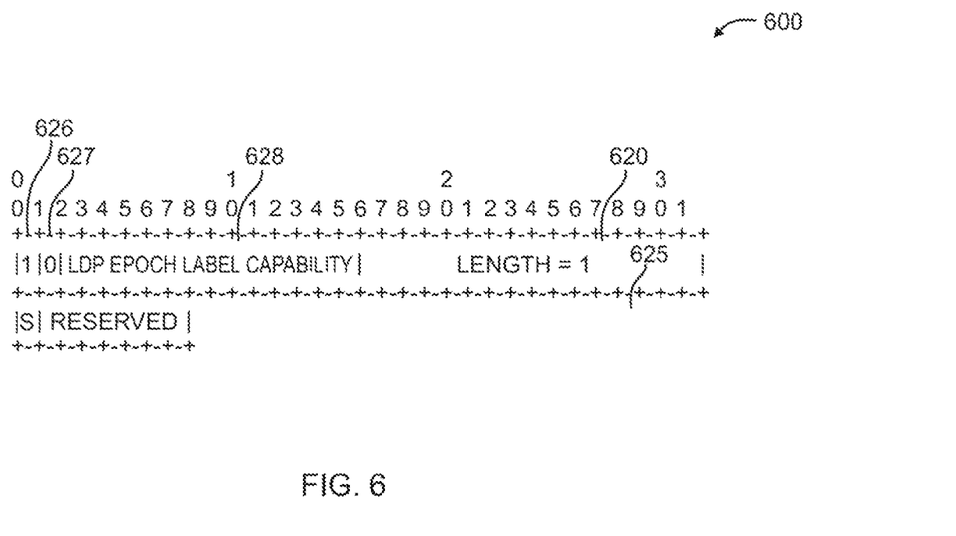
FIG. 6 depicts an exemplary format for an ELC TLV suitable for use in various embodiments discussed herein.

FIG. 6 depicts an exemplary format for an ELC TLV suitable for use in various embodiments discussed herein. Specifically, FIG. 6 depicts an exemplary ELC TLV message 600 suitable for transmission via, illustratively, an optional parameter in an LDP Hello Message to advertise thereby an Epoch Label capability associated with an LSR. In various embodiments, ELC TLVs are included in Targeted LDP (T-LDP) Hello Messages. In various embodiments, ELC TLVs are included in a Vendor Private LDP TLV space, such as defined in IETF RFC 5036.

Various embodiments provide for an ELC TFC exchange mechanism implementing the Epoch Label Capability (ELC) to be associated with label mapping messages, label withdraw messages, label release messages, label stack processing associated with packets to include Epoch Labels, discarding of packets if included Epoch Label does not match expected Epoch Label and so on as described herein.

When ELC is enabled, a specific Epoch Label handling capability is enabled or adapted, such as within the context of an LDP session. Epoch Label processing is handled as described above with respect to FIGS. 2-4. Each LSR handles Epoch Labels as a label/FEC binding assignment LSR, a packet transmitting LSR or a packet receiving LSR. Further, Epoch Label processing may be performed in conjunction with external (with respect to a particular LSR) processing elements, such as an element manager, network manager and the like.

In various embodiments, the Epoch Label capability may be turned off, constrained or adapted may be related to one or more capabilities related to the various FEC types. For example, Epoch Label capability may be used for some types of traffic with particular security concerns (e.g., virtual private network traffic), but not used for other types of traffic (e.g., broadcast television traffic).

Various embodiments use a TLV format according to RFC 5561, where the format of an existing LDP Capability TLV is kept, and the TLV is sent along with LDP Hello message. In various embodiments, session capabilities comprise a superset of capabilities having a default selection of being applicable to all Hello Adjacencies between two LSRs.

By advertising the ELC, the originating node asserts that it performs or is capable of performing the ELC-related protocol actions ELC information is optionally encoded in the format of standard LDP TLV Type denoted item 620 as shown in FIG. 6. ELC TLV 620 may carry a set of sub-TLVs (not shown), where each sub-TLV defines a specific ECL such as per traffic criteria, subscriber criteria, service provider criteria, service level agreement (SLA) and the like. As shown in FIG. 6, the first bit 626, i.e., bit 0 of ELC TLV 628 is set to 1. The second bit 627, i.e., bit 1 of ELC TLV 628 is set to 0. If the ELC TLV type is standardized then the type can be allocated from available types in LDP TLV registry in IANA (Internet Assigned Numbers Authority).

Thus, various embodiments provide methods of negotiating Epoch Label capability and distribution of Epoch Labels among LSRs. As an example, if LDP as contemplated by IETF RFC 5036 is used as a label distribution protocol, then peers may negotiate Epoch Label capability during session establishment. It is noted that IETF RFC 5561 defines a generic method of capability negotiation in LDP peers, which method may be employed within the context of the various embodiments to determine whether or not an LSR is epoch-label-capable, or to provide information sufficient to enable an LSR to become epoch-label-capable. In addition, the new capability TLV may be configured according to the following format (as noted in FIG. 6):

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+-
|1|0| LDP Epoch Label Capability|          Length = 1           |
+-+-+-+-+-+-+-+-+-+-+-+-+-+-+-+-+-+-+-+-+-+-+-+-+-+-+-+-+-+-+-+-+-
|S| Reserved   |
+-+-+-+-+-+-+-+-+
``` where:

U-bit: Unknown TLV bit, such as described in [RFC5036]. The value could be either 0 or 1 as specified in the Capability document associated with the given capability.

F-bit: Forward unknown TLV bit, as described in [RFC5036]. The value of this bit MUST be 0 since a Capability Parameter TLV is sent only in Initialization and Capability messages, which are not forwarded.

TLV Code Point: The TLV type that identifies a specific capability. This is an IANA-assigned code point (from TLV Type namespace) for a given capability as requested in the associated capability document.

S-bit: The State Bit. It indicates whether the sender is advertising or withdrawing the capability corresponding to the TLV code point. The State Bit value is used as follows:
  1—The TLV is advertising the capability specified by the TLV code point.
  0—The TLV is withdrawing the capability specified by the TLV code point.

If Epoch Label Capability is negotiated in a peering session then Epoch Labels can be distributed over the peering sessions in LDP Label Mapping Messages. A new TLV is defined as Epoch Label TLV and if present in Label Mapping Message then it MUST follow the Label TLV. The Epoch Label TLV carries the Epoch or Sequence Number for the Label value carried in Label TLV. The Epoch Label TLV may be configured according to the following format:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+-
|0|   Label Mapping (0x0400)   |         Message Length         |
+-+-+-+-+-+-+-+-+-+-+-+-+-+-+-+-+-+-+-+-+-+-+-+-+-+-+-+-+-+-+-+-+-
|                           Message ID                          |
+-+-+-+-+-+-+-+-+-+-+-+-+-+-+-+-+-+-+-+-+-+-+-+-+-+-+-+-+-+-+-+-+-
|                             FEC TLV                           |
+-+-+-+-+-+-+-+-+-+-+-+-+-+-+-+-+-+-+-+-+-+-+-+-+-+-+-+-+-+-+-+-+-
|                            Label TLV                          |
+-+-+-+-+-+-+-+-+-+-+-+-+-+-+-+-+-+-+-+-+-+-+-+-+-+-+-+-+-+-+-+-+-
|                         Epoch Label TLV                       |
+-+-+-+-+-+-+-+-+-+-+-+-+-+-+-+-+-+-+-+-+-+-+-+-+-+-+-+-+-+-+-+-+-
|                       Optional Parameters                     |
+-+-+-+-+-+-+-+-+-+-+-+-+-+-+-+-+-+-+-+-+-+-+-+-+-+-+-+-+-+-+-+-+-
```

The Epoch Label TLV may be configured according to the following format:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+-
|0|0| Epoch Label              |            Length              |
+-+-+-+-+-+-+-+-+-+-+-+-+-+-+-+-+-+-+-+-+-+-+-+-+-+-+-+-+-+-+-+-+-
|     Label                                                     |
+-+-+-+-+-+-+-+-+-+-+-+-+-+-+-+-+-+-+-+-+-+-+-+-+-+-+-+-+-+-+-+-+-
```

Various embodiments contemplate an Epoch Label Object when RSVP-TE (RFC 3209) is the Label Distribution Protocol. The Epoch Label Object is carried along with Label Object in its Resv Message. The Epoch Label Object carries the Epoch or Sequence number of the Label associated with Label Object and MUST follow Label Object in Resv Message.

The Epoch Label Object may be configured according to the following format:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+-
|                          (Epoch Label)                        |
+-+-+-+-+-+-+-+-+-+-+-+-+-+-+-+-+-+-+-+-+-+-+-+-+-+-+-+-+-+-+-+-+-
```

In various embodiments, when MP-BGP (RFC 2858) is the Label Distribution Protocol, the Epoch Label capability is negotiated during set-up of peering session. It is noted that RFC 5492 describes generic methods of Capability Advertisement with BGP-4. When a BGP speaker that supports capabilities advertisement sends an OPEN message to BGP peer, the message includes the optional parameter called Capabilities. The parameters list the capabilities supported by the speaker. An individual capability may be encoded in the following manner:

```
+------------------------------------+
|  Capability Code (1 octet)         |
+------------------------------------+
|  Capability Length (1 octet)       |
+------------------------------------+
|  Capability Value (variable)       |
~                                    ~
+------------------------------------+
```

Thus, various embodiments provide Epoch Label capability/functionality as described above for multiple protocols, including border Gateway protocol (BGP) and the like. In the case of BGP, the capability code may be assigned as a standardized IANA value.

Figure 7:
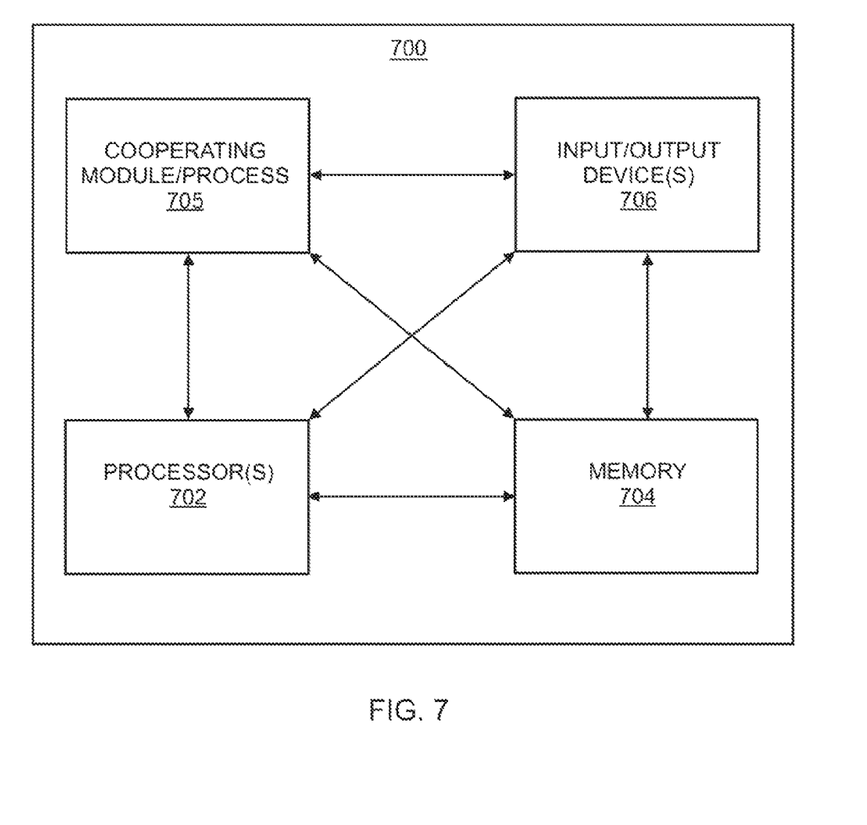
FIG. 7 depicts a high-level block diagram of a computing device, such as a processor in a telecom network element, suitable for use in performing functions described herein.

FIG. 7 depicts a high-level block diagram of a computing device, such as a processor in a telecom network element, suitable for use in performing functions described herein such as those associated with the various elements described herein with respect to the figures. The telecom network element may comprise any of the network elements discussed herein, such as the nodes 110, MS 120 and various other network elements or sub-elements (not shown) supporting the control plane and/or data plane operations as described herein.

As depicted in FIG. 7, computing device 700 includes a processor element 703 (e.g., a central processing unit (CPU) and/or other suitable processor(s)), a memory 704 (e.g., random access memory (RAM), read only memory (ROM), and the like), a cooperating module/process 705, and various input/output devices 706 (e.g., a user input device (such as a keyboard, a keypad, a mouse, and the like), a user output device (such as a display, a speaker, and the like), an input port, an output port, a receiver, a transmitter, and storage devices (e.g., a persistent solid state drive, a hard disk drive, a compact disk drive, and the like)).

It will be appreciated that the functions depicted and described herein may be implemented in hardware and/or in a combination of software and hardware, e.g., using a general purpose computer, one or more application specific integrated circuits (ASIC), and/or any other hardware equivalents. In one embodiment, the cooperating process 705 can be loaded into memory 704 and executed by processor 703 to implement the functions as discussed herein. Thus, cooperating process 705 (including associated data structures) can be stored on a tangible and non-transitory computer readable storage medium, e.g., RAM memory, magnetic or optical drive or diskette, and the like.

It will be appreciated that computing device 700 depicted in FIG. 7 provides a general architecture and functionality suitable for implementing functional elements described herein or portions of the functional elements described herein.

It is contemplated that some of the steps discussed herein may be implemented within hardware, for example, as circuitry that cooperates with the processor to perform various method steps. Portions of the functions/elements described herein may be implemented as a computer program product wherein computer instructions, when processed by a computing device, adapt the operation of the computing device such that the methods and/or techniques described herein are invoked or otherwise provided. Instructions for invoking the inventive methods may be stored in tangible and non-transitory computer readable medium such as fixed or removable media or memory, and/or stored within a memory within a computing device operating according to the instructions.

Various embodiments contemplate an apparatus including a processor and memory, where the processor is configured to perform the various functions described herein, as well communicate with other entities/apparatus including respective processors and memories to exchange control plane and data plane information in accordance of the various embodiments.

In at least some embodiments, an apparatus includes a processor and a non-transitory memory communicatively connected to the processor where the processor is configured via instructions within the non-transitory memory to support LSR data plane and control plane communication with other similarly configured LSRs. Each LSR including a respective processor and memory communicatively connected thereto may perform the various steps described above with respect to assigning label/FEC bindings, associating such bindings with Epoch Labels, processing packets to be transmitted to include Epoch Labels, processing packets received in accordance with Epoch Labels, storing local data associated with Epoch Labels, negotiating Epoch Label capability with other LSRs and so on as described herein with respect to the various figures.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

What is claimed is:

1. A method for enabling validation of packets received from a label switched router (LSR) via a label switched path (LSP), the method comprising:
   by an assigning LSR, associating each of at least one LSP label to forwarding equivalency class (FEC) bindings with a respective Epoch Label;
   by the assigning LSR, storing each label/FEC binding and respective Epoch Label in a Label Forwarding Information Base (LFIB); and
   by the assigning LSR, including, within each Label Mapping Message (LMM) advertising a label/FEC binding via a label distribution protocol (LDP), the respective Epoch Label;
   wherein an LSP labeled packet including an Epoch Label not associated with the LSP label is deemed invalid.

2. The method of claim 1, further comprising:
   determining, using the LSP label of a received packet, an expected Epoch Label associated with the received packet; and
   identifying a received packet as invalid if the Epoch Label of the received packet is not the expected Epoch Label.

3. The method of claim 1, wherein said label/FEC bindings and Epoch Labels are advertised via the LDP.

4. The method of claim 3, wherein said LDP substantially conforms to one or more of IETF RFC 5036, RSVP-TE and border gateway protocol (BGP).

5. The method of claim 1, wherein said label/FEC bindings and epoch labels are stored in a label forwarding information base.

6. The method of claim 1, wherein each Epoch Label associated with a label/FEC binding comprises a random number or one of a sequence of numbers.

7. The method of claim 1, further comprising indicating Epoch Label Capability (ELC) with at least one adjacent LSR.

8. The method of claim 7, wherein ECL of an LSR is indicated via an LDP ELC type-length-value (TLV).

9. The method of claim 7, wherein said LDP ELC TLV is carried within an Optional Parameter portion of a Hello Message.

10. The method of claim 1, wherein said Epoch Label is stored in an incoming Label Map (ILM) portion of said LFIB, and determining whether said received packet associated with an expected Epoch Label comprises comparing an Epoch Label within the received packet to an Epoch Label stored in the ILM and associated with the received packet LSP label.

11. An apparatus for enabling validation of packets received from a label switched router (LSR) via a label switched path (LSP), the apparatus comprising:
   a processor and a memory communicatively connected to the processor, the processor configured to:
   associate each of at least one LSP label to forwarding equivalency class (FEC) bindings with a respective Epoch Label;
   store each label/FEC binding and respective Epoch Label in a Label Forwarding Information Base (LFIB); and
   include, within each Label Mapping Message (LMM) advertising a label/FEC binding via a label distribution protocol (LDP), the respective Epoch Label;
   wherein an LSP labeled packet including an Epoch Label not associated with the LSP label is deemed invalid.

12. The apparatus of claim 11, wherein the processor is configured to:
   determine, using the LSP label of a received packet, an expected Epoch Label associated with the received packet; and
   identify a received packet as invalid if the Epoch Label of the received packet is not the expected Epoch Label.

13. The apparatus of claim 11, wherein the processor is configured to:
   in response to a determination that a label/FEC binding should be terminated, transmit a Label Withdraw Message (LWM) including a label/FEC binding and associated Epoch Label to at least one LSP.

14. The apparatus of claim 11, wherein said apparatus comprises a label/FEC binding assigning LSR adjacent to at least one other LSR along an LSP.

15. An apparatus for processing packets prior to transmission toward a next label switched router (LSR) via a label switched path (LSP), the apparatus comprising:
- a processor and a memory communicatively connected to the processor, the processor configured to:
- configure a transmission packet to include an LSP label bound to the forward equivalency class (FEC) including the transmission packet; and
- configure the transmission packet to include an Epoch Label associated with the LSP label.

16. The apparatus of claim 15, wherein said packet is configured using information stored in a Next Hop Label Forwarding Entry (NHLFE) within a Forwarding Information Base (LFIB) associated with the apparatus.

17. The apparatus of claim 16, wherein the processor is configured to:
- receive a Label Mapping Message (LMM) including a label/FEC binding and an associated Epoch Label; and
- store said label/FEC binding and associated Epoch Label within said NHLFE.

18. The apparatus of claim 17, wherein the processor is configured to:
- receive a Label Withdraw Message (LWM) including at least a label/FEC binding;
- delete said label/FEC binding and any associated Epoch Label from said NHLFE; and
- transmit a Label Release Message (LRM).

19. The apparatus of claim 15, wherein said apparatus comprises an LSR adjacent to a label/FEC binding assigning LSR along an LSP.

20. A tangible and non-transient computer readable storage medium storing instructions which, when executed by a computer, adapt the operation of the computer to provide a method for enabling validation of packets received from a label switched router (LSR) via a label switched path (LSP), the method comprising:
- associating each of at least one LSP label to forwarding equivalency class (FEC) bindings with a respective Epoch Label;
- storing each label/FEC binding and respective Epoch Label in a Label Forwarding Information Base (LFIB); and
- including, within each Label Mapping Message (LMM) advertising a label/FEC binding via a label distribution protocol (LDP), the respective Epoch Label;
- wherein an LSP labeled packet including an Epoch Label not associated with the LSP label is deemed invalid.

* * * * *